May 22, 1951  C. H. VIDAL  2,553,990
CHUCK

Filed Jan. 27, 1948  2 Sheets-Sheet 1

INVENTOR
CHARLES HENRY VIDAL

May 22, 1951 C. H. VIDAL 2,553,990
CHUCK

Filed Jan. 27, 1948 2 Sheets-Sheet 2

INVENTOR
CHARLES HENRY VIDAL
By his attorneys
Stebbins, Blenko & Webb

Patented May 22, 1951

2,553,990

UNITED STATES PATENT OFFICE 2,553,990

CHUCK

Charles Henry Vidal, London, England; Eileen Mavis Vidal, executrix of said Charles Henry Vidal, deceased, assignor to Dacre Chucks Limited, London, England Application January 27, 1948, Serial No. 4,592
In Great Britain November 15, 1946

Section 1, Public Law 690, August 8, 1946
Patent expires November 15, 1966

15 Claims. (Cl. 279—56)

This invention relates to chucks of the kind in which a number of jaws may be moved towards and away from one another by a suitable transmission operated externally of the chuck.

According to this invention, a chuck of the above kind comprises a compartment formed in the chuck body and filled with an incompressible distortable substance or a liquid substance, a number of plungers so mounted as to be movable into and out of said compartment, means operable externally of the chuck for applying said movement to one or more of said plungers, and means transmitting the resulting movement of the remaining plunger or plungers to the chuck jaws in a gripping direction.

The incompressible distortable substance may comprise natural or synthetic rubber.

Preferably there is provided in addition to the above arrangement an independent transmission operable externally of the chuck for applying comparatively rapid movement to the jaw chucks into or out of gripping positions while the first said arrangement is so constructed as to apply a small movement to the jaws with a high gripping force by the application of a comparatively small force to the means operable externally of the chuck.

The step up between the externally applied force and the gripping force exerted by the jaws may be provided by an appropriate transmission between an external operating member and the first said plunger or plungers and/or by selecting the relative areas of the first and second said plungers presented to the substance in said chamber.

In applying the invention to a chuck in which the movement of the jaws towards and away from one another is obtained by providing the jaws and a part of the chuck with inter-engaging faces inclined to the axis of rotation of the chuck and by applying axial movement to the chuck jaws, the aforesaid second plunger is arranged to move axially into and out of said compartment so as to apply said axial movement to the jaws.

The first said plunger or plungers may be mounted to move axially or transversely to the said axis.

In one form of construction according to this invention, the chuck body is formed at one end for attachment to the spindle of the tool with which it is to be used, while the other end is formed with the aforesaid compartment, the wall of which is externally threaded to receive an internally threaded sleeve having an internal conical face, and a plunger is arranged in the compartment so that its outer end is directed towards the conical face and the chuck jaws are disposed between these two parts whereby rotation of the sleeve may cause the jaws to be forced together.

In the case where the chuck body is provided with an internally threaded bore for engagement with a threaded tool spindle, a plunger may be mounted in the part of the chuck body between the compartment and said threaded bore so as to be engageable by the end of the threaded spindle. Thus by rotating the chuck body relatively to the spindle, the plunger may be forced into the compartment, thereby applying gripping force to the jaws.

In the case where the chuck body is provided with a taper bore for engaging a taper spindle, the first said plunger or plungers may comprise a screw plug or plugs which extend through the chuck body transversely to the axis of the chuck into said compartment.

In an alternative arrangement, a number of pins are arranged in passages extending from an end face of the chuck body to said compartment so as to project from said end face, and means are provided on the chuck body for applying end thrust to the projecting ends so as to force them into the substance in said compartment.

The means for applying said end thrust may comprise an internally threaded sleeve engaging external threads on the end of the chuck body and having an inwardly extending flange overlying the projecting ends of the pins.

The following is a description of a number of embodiments of the invention, reference being made to the accompanying drawings in which each of the figures is a section through a chuck along the axis of rotation thereof.

Figure 1:
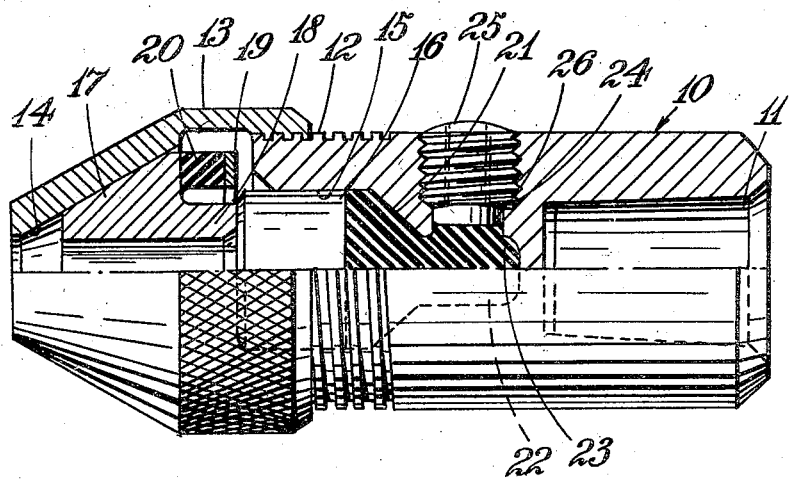
Fig. 1 shows one embodiment of the present invention displaying the relation of the assembled units and attached parts.

In the arrangement shown in Figure 1, the chuck body 10 is provided at one end with a taper bore 11 for engagement with a taper spindle of the tool with which it is to be used. The other end of the chuck body is externally threaded at 12 to receive an internally threaded sleeve 13 which is provided with an internal conical surface 14. The latter end of the chuck body is formed with a compartment having a cylindrical outer end 15 in which is mounted a plunger 16. Chuck jaws 17 are arranged between this plunger and the conical surface 14 of the sleeve and are provided with inclined faces which engage this conical surface. The heel portions 18 of the jaws are arranged to abut the plunger. The jaws are secured to a back plate 19 by rubber connecting pieces in a manner described in the specification of patent application No. 33,989/46. The cylindrical portion of the compartment adjoins a conical portion 21 and a smaller cylindrical portion 22. These latter portions of the compartment are filled with a plug of rubber 23. An internally threaded passage 24 is formed in the wall of the chuck opposite the smaller cylindrical portion 23 of the compartment and is engaged by a screw plug 25 having an end portion 26 constituting a plunger which may be thrust into the rubber filling 23, which action results in the plunger 16 applying end pressure to the jaws 17 causing them to be forced together. It will be noted that the area of the plunger 26 is considerably less than that of the plunger 16 whereby a comparatively small force applied to the threaded plug 25 results in a large force being applied to the jaws. In operation, after inserting the tool to be gripped by the jaws, the sleeve 13 is rotated so as to bring the jaws rapidly into engagement with the tool, whereafter heavy gripping pressure is applied to the jaws by manipulation of the plug 25.

Figure 2:
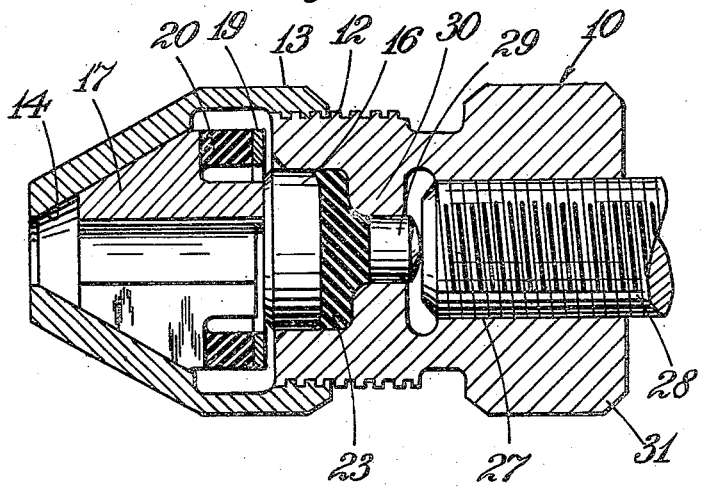
Fig. 2 is a longitudinal sectional view showing another alternate form of the present invention.
Figure 3:
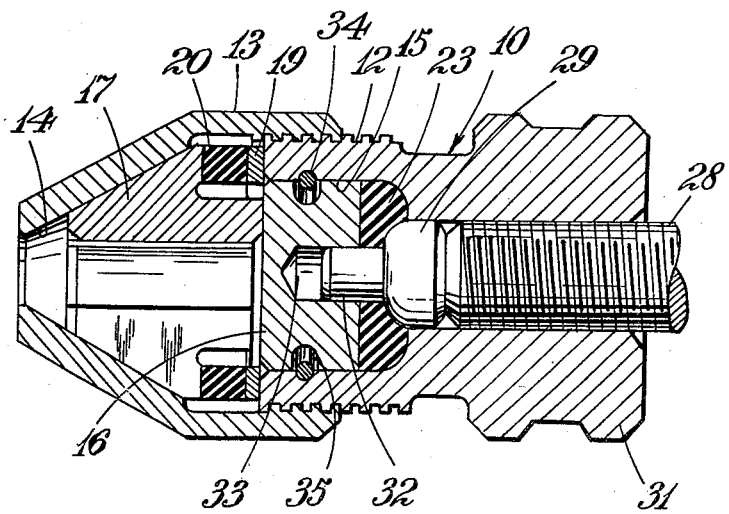
Fig. 3 is a longitudinal sectional view showing another alternate form of the present invention.

The arrangement shown in Figure 2 differs from that shown in Figure 1 in that the chuck body 10 is provided with an internally threaded bore 27 for engagement with a threaded spindle with which the chuck is to be used. Instead of a plunger being provided by a threaded plug extending transversely through a wall of the chuck body, there is provided a plunger 29 extending axially through a part of a chuck body 30 between the compartment containing the rubber filling 23 and the threaded bore, which plunger is engageable by the end of the spindle 28. With this arrangement, heavy gripping pressure may be applied to the jaws 17 by rotating the chuck body 10 relatively to the spindle 28. For this purpose the chuck body may be provided with an enlarged portion 31 which may be roughened by knurling so that a secure grip may be obtained by hand. The threads on the spindle 28 may be so arranged that the torque transmitted through the chuck body tends to force the plunger 29 into the rubber filling. The arrangement shown in Figure 3 is similar to that of Figure 2 and differs mainly in the form of the plunger 29. This plunger is provided with a reduced portion 32 which extends completely through the rubber filling 23 into a bore 33 formed in the plunger 16 so as to be a good sliding fit therein. The plunger is retained in the cylindrical portion of the bore 15 by means of a spring ring 34 which engages a groove in the cylindrical bore portion and is loosely accommodated in a circumferential groove 35 formed in the plunger 16.

Figure 4:
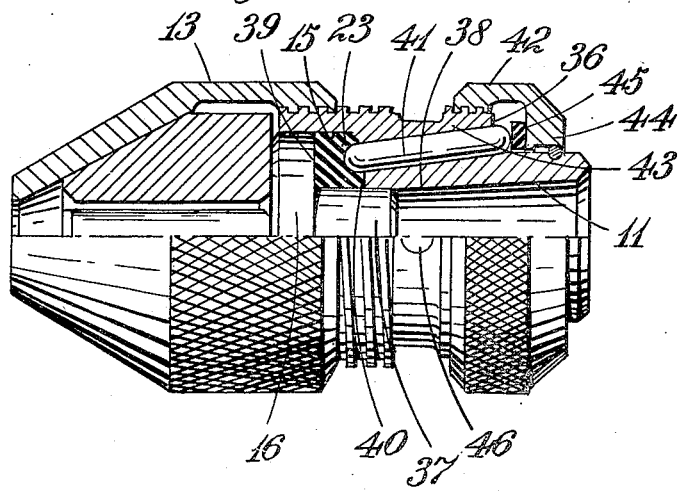
Fig. 4 is a partial sectional view showing still another alternate form of the present invention.

The chuck shown in Figure 4 is designed particularly for use with conical taper spindles so as to maintain the bulk of the chuck as small as possible. The chuck body, as in Figure 1, is provided with a taper bore 11 for engagement with the taper spindle, and the end of the chuck body containing this bore is reduced in external diameter to provide an end face or shoulder 36. The plunger 16 is stepped and the smaller portion 37 thereof extends into a cylindrical extension 38 of the taper bore 11. The rubber filling 23 encircles the smaller part 37 of the plunger and is enclosed between the cylindrical wall 15 of the chuck body, the step 39 between the two parts of the plunger and the internal transverse wall 40 of the chuck body. Inclined passages extend between the end face 36 of the chuck body and the aforesaid transverse wall 40, and mounted in each of these passages is a pin 41. The pins project from the end face 36 and end thrust may be applied to them by an internally threaded sleeve 42 which engages a threaded portion 43 at the end of the chuck body, which sleeve is provided with an inwardly directed flange 44 overlying the ends of the pins. A thrust ring 45 or thrust face may be provided between the flange and the ends of the pins. The chuck body may be provided with a number of holes 46 for engagement by a tommy bar. With this arrangement, after a tool has been gripped by the jaws by initial rotation of the sleeve 13, a tommy bar may be placed in one of the holes 46 and the ring 42 is then rotated relatively to the chuck body, thereby forcing the pins 41 into the rubber filling 23. This results in axial pressure being applied to the plunger 16 causing the jaws to be forced inwards.

The aforesaid rubber filling may either be moulded in situ or in a separate mould and then introduced into the compartment in the chuck body so as to be a good fit therein.

I claim:

1. A chuck comprising a chuck body, a number of jaws mounted to move relatively to said body towards and away from one another, which chuck body is formed with a closed compartment, an incompressible distortable substance in said compartment, a number of plungers, means operable externally of the chuck for applying movement to at least one of said plungers so that it projects to a greater or lesser extent into said substance, and means for transmitting movement from the remainder of the plungers to said jaws in a gripping direction.

2. A chuck comprising a chuck body, a number of jaws mounted to move relatively to said body towards and away from one another, which chuck body is formed with a closed compartment, a rubber material in said compartment, a number of plungers, means operable externally of the chuck for applying movement to at least one of said plungers so that it projects to a greater or lesser extent into said substance, and means for transmitting movement from the remainder of the plungers to said jaws in a gripping direction.

3. A chuck comprising a chuck body, a number of jaws mounted to move relatively to said chuck body towards and away from one another, which chuck body is formed with a closed compartment, an incompressible distortable substance in said compartment, two plungers, means operable externally of the chuck for applying movement to one of said plungers so that it projects to a greater or lesser extent into said substance, and means for transmitting movement from the other plunger to said jaws in a gripping direction.

4. A chuck comprising a chuck body, a number of jaws mounted to move relatively to said chuck body towards and away from one another, which chuck body is formed with a closed compartment, an incompressible distortable substance in said compartment, a number of plungers, means operable externally of the chuck for applying simultaneous movement to a number of said plungers so that they project to a greater or lesser extent into said substance and means for transmitting movement from another plunger to said jaws in a gripping direction.

5. A chuck comprising a chuck body, a number of jaws mounted to move relatively to said body towards and away from one another, a transmission operable externally of the chuck for applying rapid movement to the chuck jaws into or out of gripping positions, which chuck body is formed with a closed compartment, incompressible distortable substance in said compartment, a number of plungers, means operable externally of the chuck for applying movement to at least one of said plungers so that it projects to a greater or lesser extent into said substance, and means for transmitting movement from the remainder of the plungers to said jaws in a gripping direction.

6. A chuck comprising a chuck body, a number of jaws mounted to move relatively to said body towards and away from one another, which chuck body is formed with a closed compartment, an incompressible distortable substance in said compartment, a number of plungers, an operating member so mounted on said chuck body and associated with at least one of said plungers that a force applied to the operating member is magnified on the distortable substance and means for transmitting movement from the remainder of the plungers to said jaws in a gripping direction.

7. A chuck comprising a chuck body, a number of jaws mounted to move relatively to said body towards and away from one another, which chuck body is formed with a closed compartment, an incompressible distortable substance in said compartment, a number of plungers, means operable externally of the chuck for applying movement to at least one of said plungers so that it projects to a greater or lesser extent into said substance, and means for transmitting movement from the remainder of the plungers to said jaws in a gripping direction, the relative areas of the plungers which are actuated by the external means and which transmit movement to said jaws being selected to provide a step-up between the externally applied force and the gripping force exerted by the jaws.

8. A chuck comprising a chuck body, a number of jaws having outer faces inclined to the chuck axis and mounted to move relatively to said body towards and away from one another, a chuck part encircling said jaws and contacting with the inclined faces, means for imparting axial movement between said chuck part and chuck body, which chuck body is formed with a closed compartment, an incompressible distortable substance in said compartment, a number of plungers, means operable externally of the chuck for applying movement to at least one of said plungers so that it projects to a greater or lesser extent into said substance, another of which plungers is axially movable in the chuck body and is adapted to impart axial movement to said jaws towards said encircling chuck part.

9. A chuck comprising a chuck body, a number of jaws having outer faces inclined to the chuck axis and mounted to move relatively to said body towards and away from one another, a chuck part encircling said jaws and contacting with the inclined faces, means for imparting axial movement between said chuck part and chuck body, which chuck body is formed with a closed compartment, an incompressible distortable substance in said compartment, a number of plungers, at least one of which plungers is movable transversely to the axis of said chuck and another of which plungers is axially movable in the chuck body and is adapted to impart axial movement to said jaws towards said encircling chuck part.

10. A chuck comprising a chuck body formed at one end for attachment to the spindle of a tool with which it is to be used, a closed compartment formed at the other end, the surrounding wall of which compartment is externally threaded to receive an internally threaded sleeve having an internal conical face, an incompressible distortable substance in said compartment, a plunger axially movable in said compartment and having its outer end directed towards the conical face, chuck jaws arranged to abut said outer end and provided with inclined faces for engaging said conical face, at least one other plunger movable into and out of said compartment, means operable externally of the chuck for applying movement to said other plunger.

11. A chuck comprising a chuck body having an internally threaded bore at one end for engagement with a threaded spindle of the tool with which it is to be used, a closed compartment formed in the other end, the surrounding wall of which compartment is externally threaded to receive an internally threaded sleeve having an internal conical face, an incompressible distortable substance in said compartment, a plunger axially movable in said compartment and having its outer end directed towards the conical face, chuck jaws arranged to abut said outer end and provided with inclined faces for engaging said conical face, another plunger mounted in a partition between the compartment and the internally threaded bore so as to be engageable by the end of the threaded spindle and so as to be movable into and out of said compartment.

12. A chuck comprising a chuck body formed at one end for attachment to the spindle of a tool with which it is to be used, a closed compartment formed at the other end, the surrounding wall of which compartment is externally threaded to receive an internally threaded sleeve having an internal conical face, an incompressible distortable substance in said compartment, a plunger axially movable in said compartment and having its outer end directed towards the conical face, chuck jaws arranged to abut said outer end and provided with inclined faces for engaging said conical face, at least one other plunger comprising a threaded plug arranged to extend through a threaded hole in the chuck body transversely to the axis of said chuck into said compartment.

13. A chuck comprising a chuck body having a face transverse to the axis of the chuck, which chuck body is formed with a closed compartment at the other end, a number of jaws mounted to move relatively to said body towards and away from one another, an incompressible distortable substance in said compartment, a number of passages extending from said transverse face to said compartment, a number of plungers mounted in said passages so as to project from the transverse face and so as to extend into said compartment, another plunger extending into said compartment and adapted to impart gripping movement to said jaws, and means provided on the chuck body for applying end thrust to the projecting ends of the first said plungers.

14. A chuck comprising a chuck body having a face transverse to the axis of the chuck, which chuck body is formed with a closed compartment at the other end, a number of jaws mounted to move relatively to said body towards and away from one another, an incompressible distortable substance in said compartment, a number of passages extending from said transverse face to said compartment, a number of plungers mounted in said passages so as to project from the transverse face and so as to extend into said compartment, another plunger extending into said compartment and adapted to impart gripping movement to said jaws, which chuck body is externally threaded, an internally threaded sleeve engaging said external threads and having an inwardly directed flange overlying the projecting ends of said plungers.

15. A chuck comprising a chuck body formed with a closed compartment, a number of jaws rubber-bonded to a back plate and assembled in front of said compartment, which jaws have inclined outer faces, an internally threaded sleeve engaging a threaded part of said body and having an internal conical face engaging the inclined faces of the jaws, an incompressible distortable substance in said compartment, a number of plungers so mounted as to be movable into and out of said compartment, means operable externally of the chuck for applying movement to at least one of said plungers and another of which plungers is arranged to abut said back plate and impart axial movement to said jaws.

CHARLES HENRY VIDAL.

REFERENCES CITED

The following references are of record in the file of this patent:

UNITED STATES PATENTS

| Number | Name | Date |
|---|---|---|
| 262,771 | Hoague | Aug. 15, 1882 |
| 339,595 | Stone | Apr. 6, 1886 |
| 1,132,550 | Bodmer | Mar. 23, 1915 |
| 1,923,283 | Stoker | Aug. 22, 1933 |
| 2,035,925 | Seamark | Mar. 31, 1936 |

FOREIGN PATENTS

| Number | Country | Date |
|---|---|---|
| 851,759 | France | Mar. 17, 1939 |